March 27, 1945. C. B. SPASE 2,372,610

HYDRAULICALLY SUPPORTED BALANCING MACHINE

Filed March 24, 1943

INVENTOR.
CHARLES B. SPASE
BY Bodell & Thompson
ATTORNEYS

Patented Mar. 27, 1945

2,372,610

UNITED STATES PATENT OFFICE 2,372,610

HYDRAULICALLY SUPPORTED BALANCING MACHINE

Charles B. Spase, Nedrow, N. Y., assignor to Lipe-Rollway Corporation, Syracuse, N. Y., a corporation of New York Application March 24, 1943, Serial No. 480,358

3 Claims. (Cl. 73—66)

This invention relates to balancing machines, that is, machines for determining whether symmetrical articles, as fly wheels, pressure plates, etc., of clutches, and any symmetrical part is out of balance, and has for its object a hydraulic balancing machine in which the work is supported at its center on the surface of a body or column of oil or hydraulic fluid, and if unbalanced, tilts in the direction of the heavier side, together with means for indicating the tilting movement.

The invention consists in the novel features and in the combinations and constructions hereinafter set forth and claimed.

In describing this invention, reference is had to the accompanying drawing in which like characters designate corresponding parts in all the views.

Figure 1:
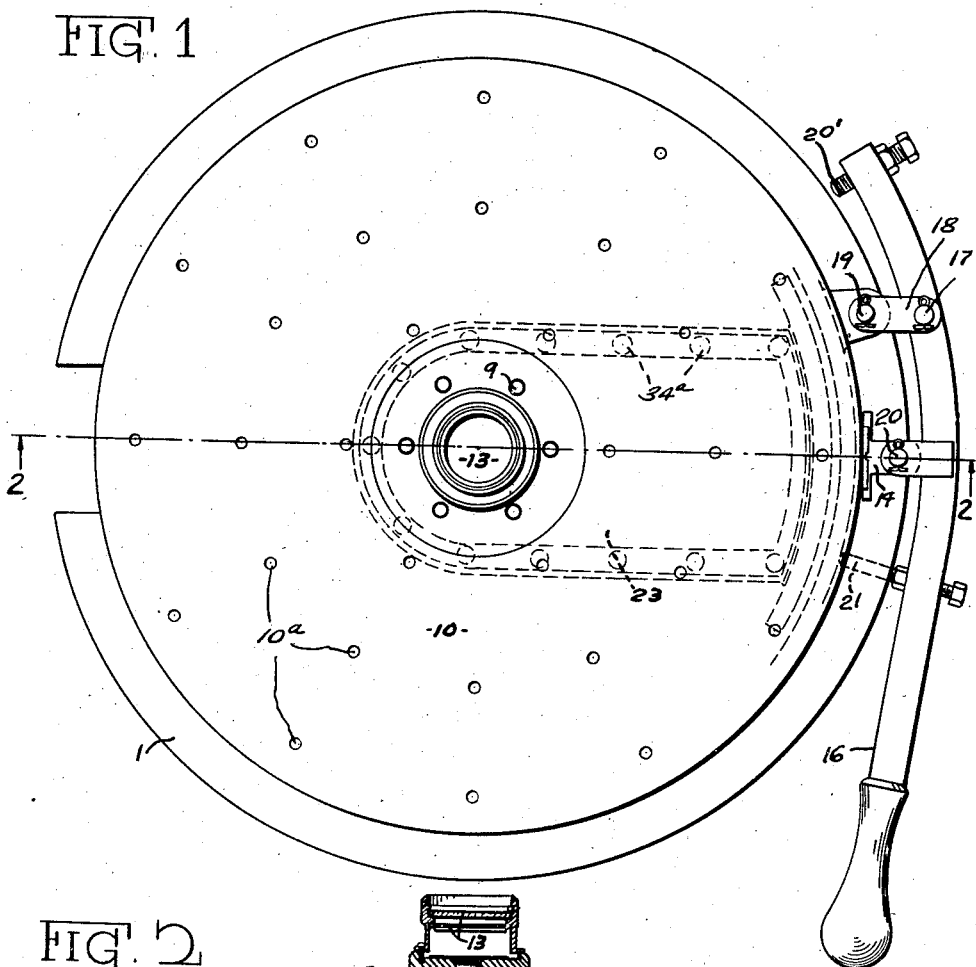
Figure 1 is a fragmentary plan view of the invention.

This hydraulic balancing machine comprises means for supporting a symmetrical piece of work axially or at its center on the surface of a body or column of oil in such a manner that, if unbalanced, it tilts radially, and means, as a spirit level, for indicating the tilting movement. More specifically, the machine includes a base provided with an upright cylinder or cylindrical portion formed with a passage for a column of oil, means for applying pressure to the oil, a work support or table including a central hub, and a floating piston on the surface of the oil and having a shank arranged coaxially with said hub and on which the hub is mounted, there being a sufficient annular space around the upper end of the cylinder to permit tilting of the work support or table and the hub.

1 designates the base, which is here shown as circular in form, and provided with an axial, upwardly extending, cylindrical portion, here shown as a separate cylinder 2 having a passage or bore 3 therethrough. 4 designates a work support or table here shown as discoidal and having a cylindrical flange 5 at the rim thereof encircling the edge of the table, this rim having a surface 6 which can bottom on a complemental surface 7 on the periphery of the base 1 for a purpose to be hereinafter set forth. The table 4 also has a central hub 8 enclosing the upper end of the cylinder 2 and spaced therefrom far enough to permit tilting movement of the table. The hub is assembled to the body of the table 4 in any suitable manner, and is held assembled therewith by suitable screws 9. The table is also preferably provided with an accurately machined face plate 10 secured thereto as by rivets 10ª.

11 is a piston resting on the body or column of oil in the cylinder 2, this being preferably a ball, so as to be extremely sensitive to tilting, the ball having a vertical shank 12 extending axially into the hub 8 and on which the hub 8 is mounted. As here shown, the shank is formed with a spherical socket for fitting over the ball. The ball is preferably secured in the socket, as by brazing or welding. The ball 11 fits with a very small clearance in the bore or passage 3 of the cylinder 2. The ball, of course, tends to sink or submerge in the oil, but the clearance around the ball is such as to permit a film of oil around the ball and momentarily form a piston packing long enough to raise the ball and the work, when pumping pressure is applied to the oil, and thus permit the work to tilt, if unbalanced. Heavy oil or oil of high viscosity is used.

The work table or support is accurately balanced and is provided with indicating means to indicate any deflection out of balance, either of the table or of the balanced table with the work thereon, this means being shown as a circular spirit level 13 on the upper end of the hub 8 coaxial therewith, so that when the work table is balanced and the work thereon is also balanced, the bubble of the spirit level will be in the center thereof. If unbalanced, the heavier side of the work on the table depresses and the bubble will move radially in the opposite direction. It will be understood that initially the table is balanced. If the spirit level shows that the table is unbalanced, the table is brought into balance by removing metal from the heavy side thereof by drilling or in any other well known manner. Also, when the work is out of balance, it is balanced by removing metal from the heavy side thereof and again tested until the bubble remains at the center of the spirit level.

Pressure is applied to the column of oil in the cylinder 2 by pump means, here shown as a pump plunger or rod 14 movable in a horizontal bore 15 in the base 1 and a suitable operating lever 16 on the outside of the base. The lever is shown as pivoted at 17 to one end of a link 18, the other end of which is pivoted at 19 to the base, the lever being also pivoted at 20 to the outer end of the plunger or rod 14. The movement of the lever is limited by adjustable stops 20', 21 located on opposite sides of its pivot 17, which stops coact with the base. The bore 15 communicates through a check valve controlled passage 22 with an oil reservoir 23 formed in the base, to receive oil from the reservoir. It also communicates through an outlet passage 24 and an inlet passage 25 provided at the lower end of the cylinder 2, a suitable check valve 26 being provided in the passage 24. In order to keep the oil free of air bubbles, the bore 15 also communicates with the inlet 25 of the cylinder 2 through a by-pass 27 having an adjustable metering valve 28 therein and the bore 15 also communicates with the reservoir through a check valve controlled passage 29 opening into the bore 15 at a point uncovered when the pump plunger is near the limit of its retrograde stroke, as indicated in dotted lines, at 30, the check valve 29 being such as to prevent flow of oil from the reservoir 23 therethrough, but to permit excess oil to be pumped back into the reservoir from the bore 15. The check valve 22 permits the oil to flow from the reservoir 23 into the bore 15 and is located to be uncovered by the plunger 14 at all times. The by-pass 27 communicates through a port 31 with the bore 15 located to be covered by the plunger 14 after the plunger passes part way on its pumping or power stroke.

Oil passing the ball 11 overflows through a return passage formed by a tube 32, this being an annular passage around the upper end of the cylinder 2 and opening at its lower end into a return passage or trough 33 formed in the upper side of the base 1. The reservoir and trough have a suitable cover plate 34 having a filling plug 35 for the reservoir 23. The cover plate is also provided with an upstanding tube 36 surrounding and spaced from the hub 2 and the tube 32 telescopes into the tube 36. The upper end of the tube 32 has its margins inturned at 37 and formed with air vent holes 38. The cover plate 34 is secured in position by screws 34ª.

When the work is mounted on the work support or table 4 and centered on the hub 8 thereof, the table is in its lower position, in which the surface 6 rests on the surface 7 of the base 1. The operator then operates the lever 16 to pump oil into the cylinder 2, thus lifting the table into the position shown in Figure 2. If the work is unbalanced, or heavier on one side than on the other, the work and the table will tilt, owing to the floating piston or ball 11, and the tilting movement indicated by the spirit level 13. The operator then permits the table to lower or it will lower by reason of the ball 11 submerging in the oil. The lowering of the table may be facilitated by pulling the lever 16 outwardly to release the oil pressure and permit the oil to return through the by-pass 27. Continued pumping will keep the ball, the work table and the work elevated. When the ball sinks the table lowers, and the surface 6 rests on the surface 7, and then metal may be removed by drilling from the heavy side of the work.

Figure 2:
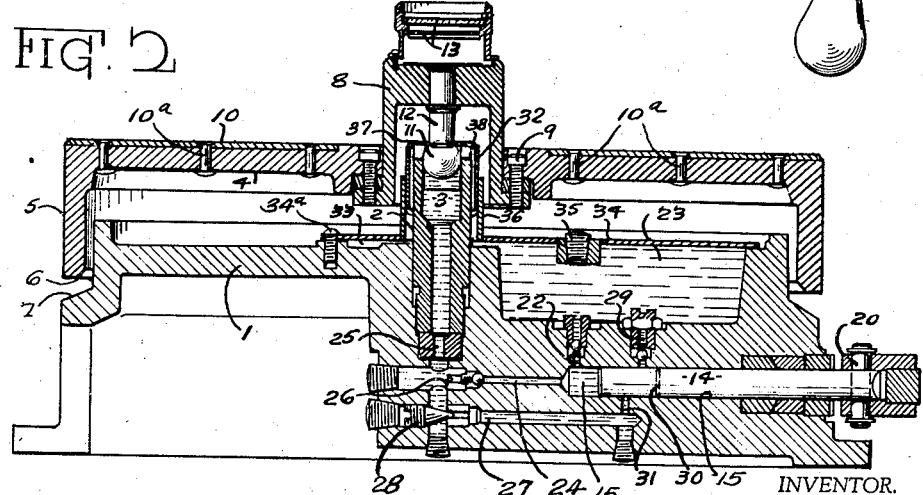
Figure 2 is a sectional view on the plane of line 2—2, Figure 1.

This machine is usually associated with a drilling press, so that the heavy portion or work can be quickly brought to the drilling position. However, this feature forms no part of this invention. When the lever 16 is operated to work the pump plunger 14, the oil is forced out through the passage 24, past the check valve 26 into the cylinder 2, applying pressure to the ball to elevate the table. Also, oil pressure re-acts past the metering valve 28, but when the pump plunger 14 is in its forward or extreme position, as shown in Figure 2, no oil passes through the by-pass 27 because the port 31 is covered by the plunger 14. When the plunger 14 is retracted to uncover the port 31 and also the port 29, oil will pass through the by-pass into the bore and also will pass from the reservoir past the check valve 22 into the bore 15. When the lever 16 is again operated to apply pressure to the plunger 14, the excess oil will at first pass by the check valve 29 back into the reservoir 23 until the port 29 is covered by the plunger 14. This is a precaution against air pockets forming in the pump or the oil system.

What I claim is:

1. A balancing machine including a base, a work carrier, the base having a surface for normally supporting the work carrier from tilting laterally, the base being also provided with an upright passage for a column of oil, the passage being open at its top, a piston located in the upper portion of the passage in or on the oil when the carrier is resting on the supporting surface and being arranged in the passage to have a lateral universal rocking movement relatively to the axis of the passage and with sufficient looseness to permit the oil to normally pass the same, and to restrict the passage of oil momentarily when the oil is given a sudden upward pumping impulse, whereby normally the piston under the weight thereon sinks in the column of oil and is propelled upwardly when a sudden pumping impulse is given to the column of oil, said piston having an upwardly extending shank rigid therewith and connected to the carrier centrally of the latter, the carrier and the shank tilting with the piston as the piston tilts laterally relative to the axis of the passage under the unbalanced weight of the work, and means for applying pressure to the oil to give it a sudden upward impulse.

2. A balancing machine including a base, a work carrier, the base having a surface for normally supporting the work carrier from tilting laterally, the base being also provided with an upright passage for a column of oil, the passage being open at its top, a piston located in the upper portion of the passage in or on the oil when the carrier is resting on the supporting surface and being arranged in the passage to have a lateral universal rocking movement relatively to the axis of the passage and with sufficient looseness to permit the oil to normally pass the same, and to restrict the passage of oil momentarily when the oil is given a sudden upward pumping impulse, whereby normally the piston under the weight thereon sinks in the column of oil and is propelled upwardly when a sudden pumping impulse is given to the column of oil, said piston having an upwardly extending shank rigid therewith and connected to the carrier centrally of the latter, the carrier and the shank tilting with the piston as the piston tilts laterally relative to the axis of the passage under the unbalanced weight of the work, means for applying pressure to the oil to give it a sudden upward impulse, a reservoir supplying the oil to said means, and overflow passages from the upper end of said upright passage to the reservoir for returning the oil passing the piston to the reservoir.

3. A balancing machine including a base, a work carrier, the base having a surface for normally supporting the work carrier from tilting laterally, the base being also provided with an upright passage for a column of oil, the passage being open at its top, a piston located in the upper portion of the passage in or on the oil when the carrier is resting on the supporting surface and being arranged in the passage to have a lateral universal rocking movement relatively to the axis of the passage and with sufficient looseness to permit the oil to normally pass the same, and to restrict the passage of oil momentarily when the oil is given a sudden upward pumping impulse, whereby normally the piston under the weight thereon sinks in the column of oil and is propelled upwardly when a sudden pumping impulse is given to the column of oil, said piston having an upwardly extending shank rigid therewith and connected to the carrier centrally of the latter, the carrier and the shank tilting with the piston as the piston tilts laterally relative to the axis of the passage under the unbalanced weight of the work, and means for applying pressure to the oil to give it a sudden upward impulse, said piston being spherical.

CHARLES B. SPASE.